United States Patent [19]

Toth et al.

[11] Patent Number: 4,614,279
[45] Date of Patent: Sep. 30, 1986

[54] SIDE TAP OPENING FOR A FILAMENT-WOUND TANK

[75] Inventors: Michael J. Toth, Brecksville; Robert G. Ensell, Kingsville, both of Ohio

[73] Assignee: ESSEF Industries, Inc., Mentor, Ohio

[21] Appl. No.: 681,366

[22] Filed: Dec. 13, 1984

[51] Int. Cl.⁴ .................. B65D 25/34; B65D 90/02; B65D 90/06; B65H 81/06

[52] U.S. Cl. ......................... 220/3; 156/173; 156/253; 220/71; 220/83; 220/414

[58] Field of Search .............. 220/3, 71, 83, 414, 220/465; 156/169, 253, 173, 175

[56] References Cited

U.S. PATENT DOCUMENTS

| | | | |
|---|---|---|---|
| 2,848,133 | 8/1958 | Rambers | 220/414 X |
| 3,106,940 | 10/1963 | Young | 156/253 X |
| 3,112,234 | 11/1963 | Krupp | 220/3 X |
| 3,280,567 | 10/1966 | Elliott et al. | 156/173 X |
| 3,293,860 | 12/1966 | Stedfeld | 220/83 X |
| 3,394,738 | 7/1968 | Baron et al. | 220/83 X |
| 3,847,716 | 11/1974 | Dorch | 220/414 X |
| 4,369,894 | 1/1983 | Grover et al. | 220/83 X |

Primary Examiner—Allan N. Shoap
Attorney, Agent, or Firm—Pearne, Gordon, Sessions, McCoy, Granger & Tilberry

[57] ABSTRACT

A filament-wound plastic pressure vessel and technique for fabricating such vessel are disclosed. The pressure vessel includes a monolithic plastic liner having a cylindrical side wall portion and domed end portions. A multiplicity of resin-impregnated reinforcing filaments are wound about at least the cylindrical side wall portion of the liner in a predetermined winding pattern. A non-axial access opening to the interior of the tank is cut through the liner and through the filaments, resulting in discontinuous filament ends at the periphery of the opening. A reinforcement is provided for the filament ends to redistribute stress transmission paths around the opening. The reinforcement includes at least one randomly oriented fibrous mat pad sandwiched between a pair of woven cloth pads having a basket weave configuration. One cloth pad has its fibrous weave oriented at 90 degrees to the axis of the pressure vessel and parallel to the axis of the pressure vessel, while the other woven cloth pad is oriented at 45 degrees with respect to the first cloth pad.

6 Claims, 5 Drawing Figures

SIDE TAP OPENING FOR A FILAMENT-WOUND TANK

BACKGROUND OF THE INVENTION

This invention relates to pressure vessels and their manufacture, and more particularly to filament-wound plastic pressure vessels having side tap openings cut through their walls.

Filament-wound plastic pressure vessels are widely employed in applications requiring superior strength-to-weight characteristics, chemical resistance, and predictable stress characteristics in specific directions. Strands or rovings of fibers, particularly continuous glass fibers, are pre-impregnated with a suitable thermosetting resin such as polyester or epoxy resin, and wound about a mandrel under controlled tension and in a predetermined pattern. The mandrel may be of a flexible or destructible material capable of being removed from the winding after curing, or may be a permanent structure remaining in the finished article. In the latter arrangement, the mandrel comprises a liner which may be a blow-molded or rotationally cast thermoplastic compatible with the thermosetting resin carried by the filaments and with the fluid which it is intended to contain. Thus, the liner serves as a fluidtight and chemically resistant barrier, while the filament winding provides structural reinforcement thereto.

Filamant-wound lined pressure vessels are employed in a wide variety of end-use applications, such as pressure accumulator tanks in home water systems and in filter tanks for swimming pools and the like. In such applications, it is desirable, and often necessary, to provide access openings in the side wall of the filament-wound, cylindrical pressure vessel for fittings such as distributor tubes, plumbing connections, or valve connections. In the case of pressure vessels fabricated by laying up porous, fibrous mats or providing a fibrous preform in the shape of the container or tank to be produced and impregnating the mats or preforms with a settable resin, the problem of providing an additional opening in the side wall of the tank is solved merely by thickening the side wall about the periphery of the additional opening to provide reinforcement in this region and to provide an adequate depth of opening for tapping to receive a connecting threaded conduit. According to U.S. Pat. Nos. 3,137,898 and Re. 25,241, the additional thickness is provided by laying up preformed pads in the desired area prior to resin-impregnation.

More complex problems, however, are present in the provision of access openings in filament-wound tanks. An obvious solution to the problem is to cut access openings in the liner which is to serve as the winding mandrel and then plug those openings with temporary closure members which serve to direct the winding filaments around the access openings. After curing, the temporary plugs are removed and permanent fittings are supplied. However, as may be appreciated, the provision of the temporary plugs disrupts the desired winding pattern and greatly increases the filament bulk around the access openings.

Prior art efforts to provide access openings in filament-wound pressure vessels also included the step of merely cutting through the side wall of the completed filament-wound tank. This, of course, was soon recognized as an unacceptable solution to the problem, since the load bearing filaments were severed, thus destroying the structural integrity of the vessel.

More acceptable solutions may be found in U.S. Pat. Nos. 3,106,940; 3,112,234; and 3,293,860. According to those patents, reinforcing patches are wound into the side wall of the tank. A number of patches may be superposed by applying additional patches between winding passes so that a stacked array of reinforcing material is provided in the side wall. After curing, the access opening is cut through the reinforced area. In all of the aforementioned patents, however, the patch is formed by peripherally winding continuous filaments between closely spaced plates, much like one would wind a spool of thread to provide a spiral-wound, flat washer-like structure having a central opening conforming to the size of the opening to be provided in the side wall of the vessel. While the spiral-wound reinforcing patch may provide dimensional stability to the tapped opening upon pressurization of the vessel, the spiral-wound filaments do not provide adequate stress paths between the severed ends of the side wall winding and around the cut opening causing the severance. A helical or spiral reinforcing patch does not provide a natural stress path flow around the opening, but intersects the cut filaments abruptly and in a non-tangential fashion. Thus, while the reinforcing patch promotes dimensional stability to the opening upon pressurization of the tank, no such stability is afforded the cut filaments by the patch.

A further deficiency in the provision of a peripherally or helically wound patch is that the central opening of the patch must be precisely dimensioned to the size of the intended cut opening in the tank. If the aperture in the patch is too large, unreinforced portions of the cut opening will provide stress concentration points which may cause cracking between the opening and the reinforcement, and if the opening is too small for the intended aperture, the peripheral windings of the patch will be severed by the cutting operation. Moreover, the final cutting operation must precisely conform to the location of the opening in the patch and this operation is difficult, since the patch is covered by windings and by resin.

SUMMARY OF THE INVENTION

According to this invention, a filament-wound plastic pressure vessel is provided which comprises a monolithic plastic liner having a cylindrical side wall portion and domed end portions. According to the invention, the term "cylindrical" is used in its geometric sense, i.e., the surface generated by a line moving parallel to the axis of the cylinder. A multiplicity of resin-impregnated reinforcing filaments, such as glass, are wound about at least the cylindrical side wall portion in a predetermined winding pattern. A reinforcing pad is placed on the surface of the plastic liner in the location where a non-axial access opening is to be provided in the pressure vessel.

The reinforcing pad comprises a plurality of alternating woven roving and chopped mat pads assembled in a stacked array. According to the broader aspects of the present invention, at least two woven roving pads are provided which sandwich a random mat pad therebetween. The woven rovings have a standard basket weave pattern and are oriented at 45 degrees with respect to each other and the chopped mat is a two-ounce mat having two-inch fibers randomly dispersed therein and held together by a suitable binder. A woven roving square is placed against the side wall of the liner, with its weave parallel and perpendicular to the axis of the pressure vessel. A square of random mat is placed over the woven mat and a further woven pad is placed over the random mat with the weave at 45 degrees to the axis of the pressure vessel.

According to a preferred aspect of the invention, another randomly oriented mat pad is placed over the second woven pad and a third woven pad covers the entire stack, with the weave of the third woven mat parallel to and at right angles to the axis of the pressure vessel.

In order to provide a smooth, tapered configuration, the size of the woven roving pads and the chopped mat pads is increased so that successively applied pads overlap the preceding pads. To reinforce a two-inch opening in the tank, it has been found desirable to provide pads which increase in size from eight inches on a side.

The stacked pads are impregnated with a suitable thermosetting resin, which is applied with the aid of a roller. The stacked pads are then securely bonded by the particular winding pattern which is applied to the liner in accordance with well-known filament winding techniques. According to this invention, the chopped mat pad or pads are sandwiched between the woven roving pads, since the filament winding operation would otherwise tend to disorient and displace the randomly oriented fibers. Such disorientation is possible because the impregnating thermosetting resin is intended to dissolve the low solubility binder employed in the chopped mat.

After the pressure vessel is wound, the resin is cured by the application of heat and is removed from the filament winding machine. Suitable access openings are drilled through the pad reinforcement, and suitable fittings are provided in the openings.

DETAILED DESCRIPTION OF THE INVENTION

Figure 1:
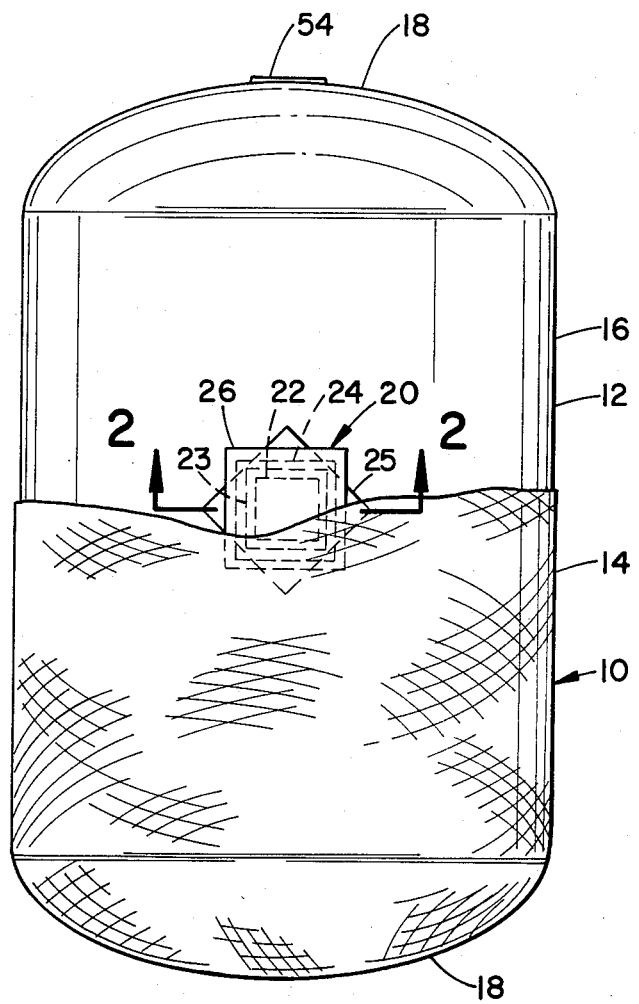
FIG. 1 is an elevational view of a pressure vessel according to this invention, with a portion of the filament winding material omitted to show details of a reinforcing pad lay-up.
Figure 2:
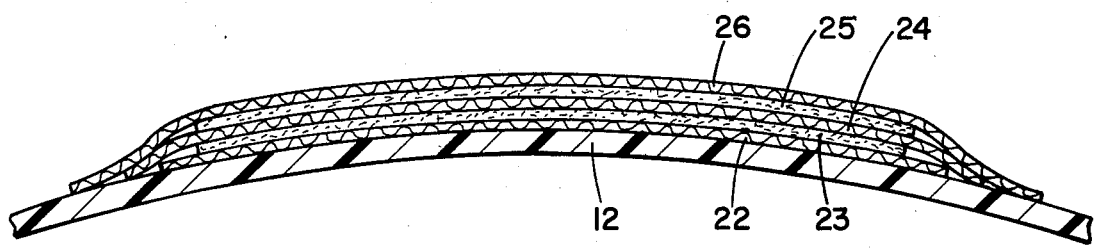
FIG. 2 is a cross-sectional view, the plane of the section being indicated by the line 2—2 in FIG. 1.

Referring now to the drawings, and particularly to FIGS. 1 and 2, there is illustrated a lined filament-wound, plastic pressure vessel 10 which includes an inner monolithic plastic liner 12 and an enveloping filament-wound reinforcement 14.

The liner 12 may be molded from a suitable thermoplastic resin by conventional molding techniques, such as rotational casting or blow-molding. The reinforcement 14 is applied by conventional filament winding techniques which generally include the steps of training a continuous filament, such as a glass filament composed of a number of ends or fibers, through a resin trough to impregnate the filament with a predetermined quantity of a liquid thermosetting resin and winding the filament on the liner in a helical pattern. The pattern covers the entire outer surface of the liner 12, including its cylindrical side wall 16 and its oblate ellipsoidal end portions 18. If desired, the reinforcement 14 may also include a level or hoop winding on the cylindrical side wall 16.

Prior to winding the reinforcement on the liner, a composite reinforcing patch 20 is applied to the liner 12 at a location where an access opening in the tank is to be provided. The reinforcing patch is comprised of a plurality of fibrous pads 22, 23, 24, 25, and 26. The pads 22, 24, and 26 are woven cloth pads formed by roving bands woven in a basket weave arrangement, while the pads 23 and 25 are two-ounce fibrous matting having randomly oriented lengths of chopped fibers bonded together with a suitable low-solubility binder. The woven pad 22 is positioned on the cylindrical side wall of the liner 12 so that its filaments are parallel to and at right angles with the longitudinal axis of the liner 12. The pad 23 is placed over the pad 22 in any desired orientation, since its fibers are randomly oriented. The pad 24 is placed so that its woven fibers are at 45 degrees with respect to the weave of the pad 22. The second randomly oriented mat pad 25 is placed on the pad 24 and is covered by the woven pad 26, which is placed so that its fibers are parallel to the fibers of the pad 22 and, therefore, at an angle of 45 degrees with respect to the fibers of the pad 24.

The pads 22–26 may be stitched together by a basting stitch to form a preassembly for ease of application to a tank liner. The pads 22–26 increase in size in order to form a tapered contour surface with respect to the liner.

The reinforcing patch 20 may be held temporarily in place against the liner 12 by pressure-sensitive adhesive tape, while the reinforcing patch 20 is impregnated with a suitable thermosetting resin. The resin may be applied to the patch 20 by means of a roller to ensure thorough impregnation thereof. Alternately, the patch 20 may be pre-impregnated with the thermosetting resin.

After the patch has been applied to the liner 12, the liner 12 is wound to provide the filament-wound reinforcement 14. The winding operation is performed by conventional filament winding techniques to provide a desired helical pattern. The winding operation completely covers the patch 20 and, as was previously indicated, the topmost pad should be a woven cloth pad in order to prevent displacement of randomly oriented fibers contained in a mat pad by the filament winding operation. Furthermore, it is preferable that the bottommost pad be a woven cloth pad to prevent displacement of the fibers in a mat pad, since the patch 20 may tend to slip on the liner under winding conditions.

It should now be appreciated that while the invention has been illustrated as including two mat pads and three woven cloth pads, the broader aspects of the invention include a single mat pad sandwiched between two cloth pads, with the cloth pads being oriented at 45 degrees with respect to each other, and with one of the cloth pads being oriented with its weave parallel to and perpendicular to the axis of the pressure vessel.

The pressure vessel may also be provided with a final level winding on its cylindrical side wall 16. In this instance, the reinforcing patch 20 may be placed between the helical winding and the level winding if the access opening is to be provided in the cylindrical side wall, or a patch may be placed on the liner 12 and after helically winding the tank, a further patch 20 may be put on the helical winding over the first patch 20 and then the second patch may be covered with the level winding.

Also according to the invention, an access opening may be provided in one of the end portions 18 rather than the cylindrical side wall of the liner without departing from the scope of the present invention.

Figure 3:
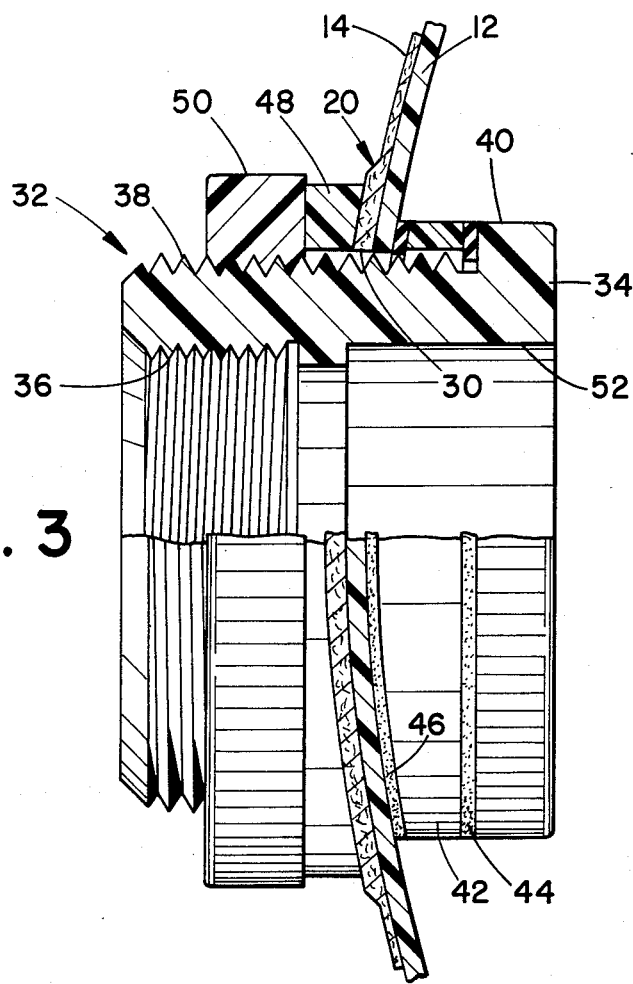
FIG. 3 is an elevational view, partly in section, illustrating a completed access opening provided with a fitting.

Referring now to FIG. 3, after the thermosetting resin and the reinforcement 14 and the patch 20 have been cured by the application of heat, an access opening 30 is drilled through the patch 20, the reinforcement 14, and the liner 12. A bulkhead fitting 32 is provided in the opening 30 to provide plumbing access to the interior of the pressure vessel. The fitting 32 includes a body portion 34 having internal and external threads 36 and 38, respectively. The portion 34 is provided with an inner flange 40 and an inner contour washer 42 separated from the flange 40 by a rubber gasket 44. Another rubber gasket 46 is provided between the contour washer 42 and the inner surface of the liner 12. An outer contour washer 48 surrounds the threads 30 and bears against the molded-in patch 20, and is held in place by a bulkhead nut 50 provided on the threads 38. An external plumbing connection may be threaded into the threads 36, while an internal pipe may be cemented to a counterbore 52 in the portion 34.

The fitting is assembled to the tank by removing the nut 50 and the washer 48 from the fitting, while leaving the gaskets 44 and 46 and the internal washer 42 in place. The fitting may then be introduced into the tank through a main access opening 54 in the tank, so that the threads 38 project through the opening 30. The washer 48 and the nut 50 are threaded onto the fitting to form a tight, leak-free installation.

Figure 4:
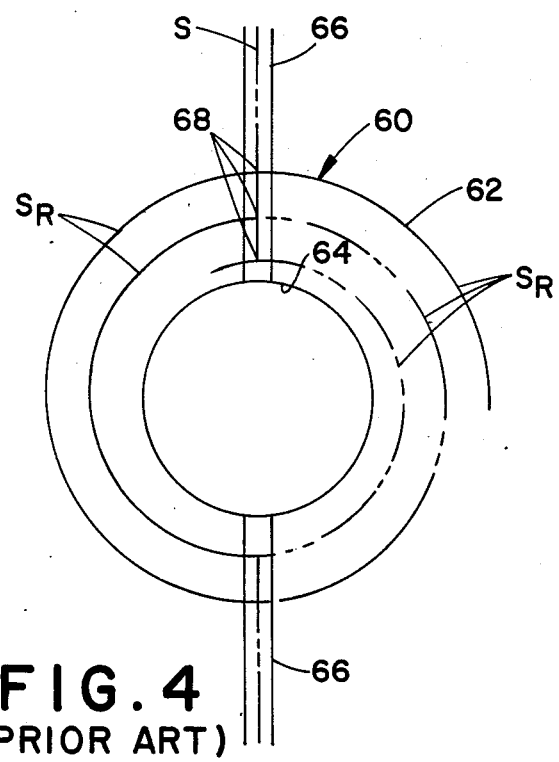
FIG. 4 is a schematic representation of a peripherally wound pad according to the prior art, illustrating the stress lines or paths across an opening in a pressure vessel.
Figure 5:
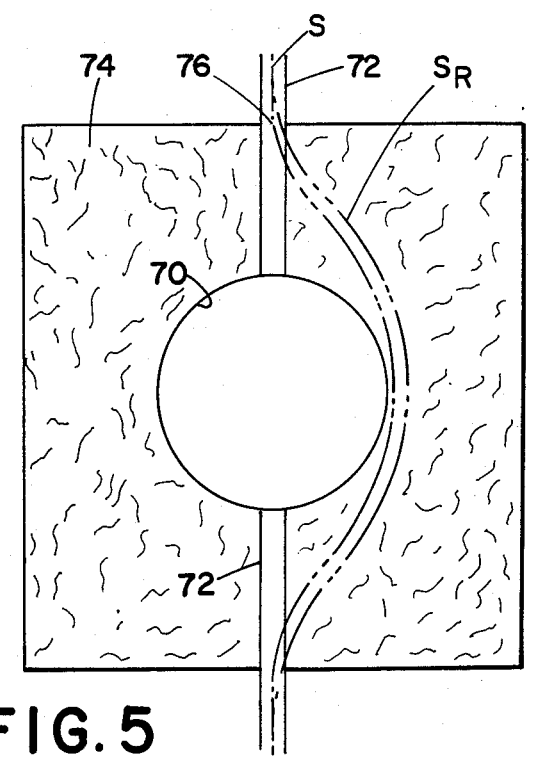
FIG. 5 is a schematic representation of a reinforcing pad according to this invention, illustrating the stress flow path provided by this invention.

Referring now to FIG. 4, there is schematically illustrated a peripherally wound reinforcing patch 60 according to the prior art. The patch 60 is prepared by peripherally winding continuous glass filaments, preimpregnated or coated with a curable thermosetting resin binder onto an axial core form between two parallel, rigid plates faced with a suitable mold release agent, and spaced apart on the axis of the winding device a distance substantially equal to the desired thickness of the reinforcing member, somewhat like winding thread on a spool, for example.

The reinforcing patch 60 is schematically illustrated as including a spiral filament 62 which surrounds as access opening 64 in a pressure vessel. The access opening 64 is cut through the tank liner and through the reinforcement windings of the tank. In FIG. 4, a single filament or roving band 66 is illustrated as being severed at the opening 64 to illustrate loading and reinforcement characteristics. The peripherally wound reinforcing filament 62 must provide a redistributed stress transmission path between the severed ends of the filament 66 so that the filament 66 may perform its reinforcing function with respect to the side wall of the pressure vessel. It may be noted, however, that the filament 62 abruptly cuts across the filament 66 so that a stress path S must follow an abrupt transition at its intersections 68, with the filament 62 to follow the redistributed stress transmission paths $S_r$ around the opening 64 to bridge that opening and join with the other end of the severed filament 66. Thus, while the filament 62 may adequately reinforce the opening 66 against dimensional enlargement under pressure, the filament 62 does not adequately define a stress transmission path which blends from the direction of applied stress in the filament 66.

Referring now to FIG. 6, there is illustrated an aperture 70 reinforced in accordance with the present invention. A severed roving filament 72 defines a stress path S, which must be redistributed across the aperture 70. The randomly oriented fibers in the pad 74 are capable of carrying loads applied in any direction in addition to loads carried by the woven pads (not shown in this figure). Redistributed stress loading around the aperture 70 are permitted to follow a natural redistributed loading path, such as, for example, the path $S_r$, which gradually curves from the initial stress path S and flows in a streamlined fashion around the aperture 70, with its point of intersection 76 and initial alignment with the stress path S being substantially tangential to its curved path portions around the opening.

Regardless of the magnitude or direction of the imposed stresses around the opening 70, which form a bridge for the severed filament 72, the random orientation of the fibers in the pad 74 serves to carry and accommodate those stresses. The cloth pads having the basket weave configuration also serve to carry the redistributed stresses and provide dimensional stability to the opening 70 upon the application of internal tank pressure.

Although the preferred embodiment of this invention has been shown and described, it should be understood that various modifications and rearrangements of the parts may be resorted to without departing from the scope of the invention as disclosed and claimed herein.

What is claimed is:

1. A filament-wound plastic pressure vessel comprising a monolithic plastic liner having a cylindrical side wall portion and domed end portions, a multiplicity of resin-impregnated reinforcing filaments wound about at least said cylindrical side wall portion in a predetermined winding pattern, a non-axial access opening cut through said pressure vessel and said filaments to provide discontinuous filament ends at the periphery of said opening, means to reinforce the filament ends by providing redistributed stress transmission paths around said opening, said reinforcing means being located between said liner and said reinforcing filaments and comprising at least two woven roving pads separated by a randomly oriented fibrous mat pad.

2. A filament-wound plastic pressure vessel according to claim 1, wherein said woven pads have a basket weave configuration and wherein the filaments of one pad are offset at an angle of 45 degrees to the filaments of another woven pad.

3. A filament-wound plastic pressure vessel according to claim 2, wherein the filaments of at least one of said woven pads are parallel to and at right angles to the axis of said pressure vessel.

4. A filament-wound plastic pressure vessel according to claim 3, wherein the reinforcing means includes three woven roving pads and two mat pads.

5. A method of making a filament-wound plastic pressure vessel comprising the steps of providing a monolithic plastic liner having a cylindrical side wall portion and domed end portions, applying a reinforcement patch to the plastic liner, said reinforcing patch including at least one chopped fiber randomly oriented mat pad sandwiched between a pair of woven roving pads, winding a multiplicity of resin-impregnated reinforcing filaments about the plastic liner in a predetermined winding pattern, curing said resin, and cutting an opening through the reinforcing filaments, the reinforcing pad, and said plastic liner to provide access to the interior of the pressure vessel.

6. A method according to claim 5, wherein said woven roving pads have a basket weave configuration and wherein the filaments of one pad are offset at an angle of 45 degrees to the filaments of another roving pad.

* * * * *